(12) United States Patent
Guan et al.

(10) Patent No.: US 12,493,625 B2
(45) Date of Patent: Dec. 9, 2025

(54) METHOD AND APPARATUS FOR SEARCH RESULT PRESENTATION

(71) Applicant: Beijing Zitiao Network Technology Co., Ltd., Beijing (CN)

(72) Inventors: Huiran Guan, Beijing (CN); Jinghua Li, Beijing (CN); Ruifang Liu, Beijing (CN); Huapeng Yang, Beijing (CN); Shuanghua Wang, Beijing (CN); Zhuqing Qu, Beijing (CN); Dongling Gao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/862,476

(22) PCT Filed: Aug. 21, 2023

(86) PCT No.: PCT/CN2023/114129
§ 371 (c)(1),
(2) Date: Nov. 1, 2024

(87) PCT Pub. No.: WO2024/078143
PCT Pub. Date: Apr. 18, 2024

(65) Prior Publication Data
US 2025/0284699 A1   Sep. 11, 2025

(30) Foreign Application Priority Data
Oct. 14, 2022   (CN) .......................... 202211261014.X

(51) Int. Cl.
*G06F 16/248* (2019.01)
(52) U.S. Cl.
CPC .................................. *G06F 16/248* (2019.01)
(58) Field of Classification Search
CPC .................................................... G06F 16/248
See application file for complete search history.

(56) References Cited

U.S. PATENT DOCUMENTS

| 10,169,449 | B2 * | 1/2019 | Lu ...................... G06F 16/9558 |
| 2015/0293999 | A1 * | 10/2015 | Zhan ................ G06F 16/24556 |
| | | | 707/723 |

(Continued)

FOREIGN PATENT DOCUMENTS

| CN | 103425662 A | 12/2013 |
| CN | 106294552 A | 1/2017 |

(Continued)

OTHER PUBLICATIONS

Chinese Patent Application No. 202211261014.X; Office Action dated Apr. 18, 2025, 21 pages with machine translation.

(Continued)

*Primary Examiner* — Jorge A Casanova
(74) *Attorney, Agent, or Firm* — BakerHostetler

(57) ABSTRACT

The disclosure provides a method and apparatus for search result presentation. Herein, the method of search result presentation includes: in response to a trigger, sending a search request carrying a book keyword; and receiving a search result corresponding to the search request, and presenting the search result on a search result page, wherein the search result comprises book information of a first book indicated by the book keyword, and a target topic content associated with the book keyword, the book keyword corresponding to a plurality of topic contents, the target topic content being obtained by filtering the plurality of topic contents based on an attribute feature of a second book indicated by the book keyword.

20 Claims, 8 Drawing Sheets

(56) References Cited

U.S. PATENT DOCUMENTS

2024/0061887 A1* 2/2024 Li .......................... G06F 16/904
2024/0121485 A1* 4/2024 Zhang .............. H04N 21/44204

FOREIGN PATENT DOCUMENTS

| | | |
|---|---|---|
| CN | 107783703 A | 3/2018 |
| CN | 110990701 A | 4/2020 |
| CN | 112825088 A | 5/2021 |
| CN | 113377975 A | 9/2021 |
| CN | 113378061 A | 9/2021 |
| CN | 113672700 A | 11/2021 |
| CN | 113778295 A | 12/2021 |
| CN | 112398947 B | 3/2022 |
| CN | 114611023 A | 6/2022 |
| CN | 114722292 A | 7/2022 |
| CN | 114817726 A | 7/2022 |
| CN | 114860919 A | 8/2022 |
| CN | 115618075 A | 1/2023 |
| KR | 102234590 B1 | 4/2021 |

OTHER PUBLICATIONS

International Patent Application No. PCT/CN2023/114129; Int'l Search Report; dated Oct. 23, 2023; 3 pages.
Chinese Patent Application No. 202211261014.X; Office Action dated Jan. 25, 2025, 18 pages with machine translation.
CN 202211261014.X; Notification of Grant dated Sep. 10, 2025, 6 pages with machine translation.
Xinbei Zhang, Research on Micro-blog Book Marketing in the New Media Era, Apr. 2015, 61 pages with English abstract.

* cited by examiner

METHOD AND APPARATUS FOR SEARCH RESULT PRESENTATION

The present application is the U.S. National Stage of International Application No. PCT/CN2023/114129, filed on Aug. 21, 2023, which claims priority to Chinese Patent Application No. 202211261014.X, filed on Oct. 14, 2022, and entitled 'METHOD AND APPARATUS FOR SEARCH RESULT PRESENTATION', which are incorporated herein by reference in their entireties.

FIELD

The present disclosure relates to the field of computer technologies, and in particular, to a method and apparatus for search result presentation.

BACKGROUND

At present, with the development of information technologies, electronic reading, as a brand-new reading method, gradually enters thousands of households. When a user searches for a book, only book information is generally presented on a search result page. However, the presented book information may not help the user determine whether to read the book. The user needs to click on the book to read a part of the book before determining whether to continue reading the book, and as a result, search efficiency is low.

SUMMARY

Embodiments of the present disclosure provide at least a method and apparatus for search result presentation.

In a first aspect, an embodiment of the present disclosure provides a method of search result presentation, characterized in including: in response to a trigger, sending a search request carrying a book keyword; and receiving a search result corresponding to the search request, and presenting the search result on a search result page, wherein the search result includes book information of a first book indicated by the book keyword, and a target topic content associated with the book keyword, the book keyword corresponding to a plurality of topic contents, the target topic content being obtained by filtering the plurality of topic contents based on an attribute feature of a second book indicated by the book keyword.

In a possible implementation, in accordance with a determination that the book keyword includes a book name, the first book and the second book indicated by the book keyword are the same; in accordance with a determination that the book keyword includes a book type, the first book indicated by the book keyword is a book that meets a first filtering condition in the book type, and the second book indicated by the book keyword is a book that meets a second filtering condition in the book type, the second book being at least partially different from the first book.

In a possible implementation, the attribute feature includes at least one of: an update status, hotness information, book quality information, or whether there is an associated book.

In a possible implementation, the target topic content is obtained, after the attribute feature of the second book indicated by the book keyword is determined, by filtering the plurality of topic contents based on a target topic subject matching the attribute feature of the second book indicated by the book keyword, and topic subjects of the plurality of topic contents corresponding to the book keyword.

In a possible implementation, presenting the search result on the search result page includes:
presenting, in a first position area of the search result page, the book information of the first book indicated by the book keyword; and presenting, at a corresponding target position of the first position area, an entry identification of the target topic content, the entry identification of the target topic content being configured to present a corresponding target topic content after being triggered.

In a possible implementation, presenting, at the corresponding target position of the first position area, the entry identification of the target topic content includes: in accordance with a determination that the entry identification of the target topic content includes a plurality, presenting, at a corresponding target position of the first position area, the entry identifications of a plurality of the target topic contents in a scrolling manner; and the method further including: in response to a trigger on the entry identification of any of the target topic contents presented in a scrolling manner, presenting a content presentation page of the triggered target topic content.

In a possible implementation, in accordance with a determination that there is a plurality of target topic contents associated with the book keyword, presenting the search result on the search result page includes: determining a presentation order of the target topic contents based on associations with respect to the book keyword and/or hotness information; and presenting, on the search result page, preview information cards corresponding to the target topic contents in the presentation order.

In a possible implementation, after presenting the search result on the search result page, the method further includes: determining key information associated with the book keyword in the book information corresponding to the search request; and labeling the key information in the presented book information.

In a second aspect, an embodiment of the present disclosure further provides an apparatus for search result presentation, including: a sending module configured to, in response to a trigger, send a search request carrying a book keyword; and a presenting module configured to receive a search result corresponding to the search request, and present the search result on a search result page, wherein the search result includes book information of a first book indicated by the book keyword, and a target topic content associated with the book keyword, the book keyword corresponding to a plurality of topic contents, the target topic content being obtained by filtering the plurality of topic contents based on an attribute feature of a second book indicated by the book keyword.

In a possible implementation, in accordance with a determination that the book keyword includes a book name, the first book and the second book indicated by the book keyword are the same; in accordance with a determination that the book keyword includes a book type, the first book indicated by the book keyword is a book that meets a first filtering condition in the book type, and the second book indicated by the book keyword is a book that meets a second filtering condition in the book type, the second book being at least partially different from the first book.

In a possible implementation, the attribute feature includes at least one of: an update status, hotness information, book quality information, or whether there is an associated book.

In a possible implementation, the target topic content is obtained, after the attribute feature of the second book indicated by the book keyword is determined, by filtering the plurality of topic contents based on a target topic subject matching the attribute feature of the second book indicated by the book keyword, and topic subjects of the plurality of topic contents corresponding to the book keyword.

In a possible implementation, the presenting module is configured to, when presenting the search result on the search result page: present, in a first position area of the search result page, the book information of the first book indicated by the book keyword; and present, at a corresponding target position of the first position area, an entry identification of the target topic content, the entry identification of the target topic content being configured to present a corresponding target topic content after being triggered.

In a possible implementation, the presenting module is configured to, when presenting, at the corresponding target position of the first position area, the entry identification of the target topic content: in accordance with a determination that the entry identification of the target topic content includes a plurality, present, at a corresponding target position of the first position area, the entry identifications of a plurality of the target topic contents in a scrolling manner; and the method further includes: in response to a trigger on the entry identification of any of the target topic contents presented in a scrolling manner, presenting a content presentation page of the triggered target topic content.

In a possible implementation, in accordance with a determination that there is a plurality of target topic contents associated with the book keyword, the presenting module is configured to, when presenting the search result on the search result page: determine a presentation order of the target topic contents based on associations with respect to the book keyword and/or hotness information; and present, on the search result page, preview information cards corresponding to the target topic contents in the presentation order.

In a possible implementation, after presenting the search result on the search result page, the presenting module is further configured to: determine key information associated with the book keyword in the book information corresponding to the search request; and label the key information in the presented book information.

In a third aspect, an embodiment of the present disclosure further provides a computer device, including: a processor, a memory, and a bus, the memory storing machine-readable instructions executable by the processor, the processor, when the computer device runs, communicating between the processor and the memory through the bus, the machine-readable instructions, when executed by the processor, executing steps of the method of search result presentation of the first aspect.

In a fourth aspect, an embodiment of the present disclosure further provides a computer-readable storage medium having a computer program stored thereon, the computer program, when executed by the processor, executing steps of the method of search result presentation of the first aspect.

According to the method and apparatus for search result presentation provided in the embodiments of the present disclosure, when a user searches for a book, in addition to book information of a first book indicated by a book keyword, a target topic content associated with the book keyword may also be presented on a search result page. In this way, the user can select a book based on the book information and the target topic content. In this way, the user can be assisted in selecting the book through the target topic content, and the user can quickly find a book of interest, thereby improving search efficiency. In addition, the target topic content associated with the book keyword is presented on the search result page, thereby improving the participation of the user in the topic content and the browsing efficiency of the user for the topic content.

To make the above objectives, features, and advantages of the present disclosure more comprehensible, the following preferred embodiments are described in detail below with reference to the accompanying drawings.

BRIEF DESCRIPTION OF THE DRAWINGS

In order to more clearly illustrate the technical solutions in the embodiments of the present disclosure, the accompanying drawings for describing the embodiments will be briefly described below. The accompanying drawings herein are incorporated in and form a part of the specification, illustrate embodiments consistent with the present disclosure, and are used in conjunction with the specification to describe the technical solutions of the present disclosure. It should be understood that the following accompanying drawings show only some embodiments of the present disclosure, and therefore should not be construed as a limitation on the scope. Persons of ordinary skill in the art may still derive other related drawings from these accompanying drawings without creative efforts.

DETAILED DESCRIPTION

Figure 1:
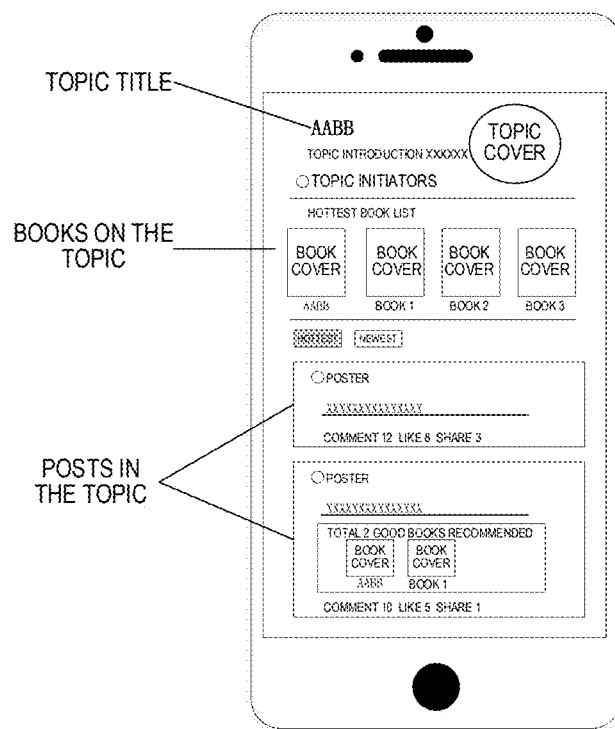
FIG. 1 shows a presentation effect diagram of a topic content presentation page in a method of search result presentation according to an embodiment of the present disclosure.

To make the objectives, technical solutions, and advantages of the embodiments of the present disclosure clearer, the technical solutions in the embodiments of the present disclosure will be described clearly and completely below with reference to the accompanying drawings in the embodiments of the present disclosure. It is obvious that the described embodiments are only some embodiments of the present disclosure, but not all embodiments. Components of the embodiments of the present disclosure generally described and shown in the accompanying drawings herein may be arranged and designed in various different configurations. Therefore, the following detailed description of the embodiments of the present disclosure provided in the accompanying drawings is not intended to limit the scope of protection claimed by the present disclosure, but merely represents selected embodiments of the present disclosure. All other embodiments obtained by a person of ordinary skill in the art based on the embodiments of the present disclosure without creative efforts shall fall within the protection scope of the present disclosure.

In the related art, when a user searches for a book, only book information (for example, preview information of a book, including a book cover, a book name, a book introduction, and the like) is generally presented on a search result page. However, the user may not determine whether to read the book based only on the book information, and the user needs to click on the book to read a part of the book before determining whether to continue reading the book. However, the book clicked by the user may not be a book of interest to the user, and the user needs to return to the search result page to view a further book. In this way, the user needs to select for many times to view a book that is actually of interest, and search efficiency is low.

In addition, in the related art, a function entry of an interactive community is generally set relatively secretly. For example, when a user wants to view a book circle corresponding to a certain book, the user needs to first enter a reading interface of the book, and then click a function button on the reading interface to find the book circle corresponding to the book. In this way, it is difficult for the user to directly participate in the interaction, which in turn affects the browsing efficiency of the user for interactive content.

Based on the above research, the present disclosure provides a method and apparatus for search result presentation. When a user searches for a book, in addition to book information of a first book indicated by a book keyword, target topic content associated with the book keyword may also be presented on a search result page. In this way, the user can select a book based on the book information and the target topic content. In this way, the user can be assisted in selecting the book through the target topic content, and the user can quickly find a book of interest, thereby improving search efficiency. In addition, the target topic content associated with the book keyword is presented on the search result page, thereby improving the participation of the user in the topic content and the browsing efficiency of the user for the topic content.

Special terms involved in the embodiments of the present application are briefly described below.

A topic: a subject for communication between users in a client. A topic may be raised by a certain user, and other users may post posts in the topic to discuss around the topic. The topic may further include a book related to the topic. For example, a presentation page corresponding to the topic may be as shown in FIG. 1.

Figure 2:
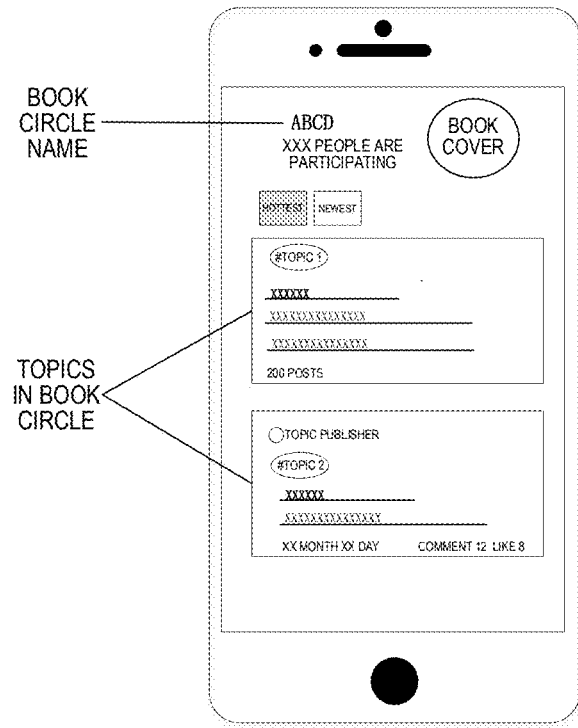
FIG. 2 shows a presentation effect diagram of a book circle presentation page in the method of search result presentation according to an embodiment of the present disclosure.

A book circle: a circle that is pre-created by a developer or a user and where users can communicate around a certain book. In this specification, the book circle includes a topic for discussion on at least one fixed book (where the several books may refer to a series of books, for example, Journey to the West 1 and Journey to the West 2), and the topic may be created by the user. For example, a presentation page corresponding to the book circle may be as shown in FIG. 2.

Figure 3:
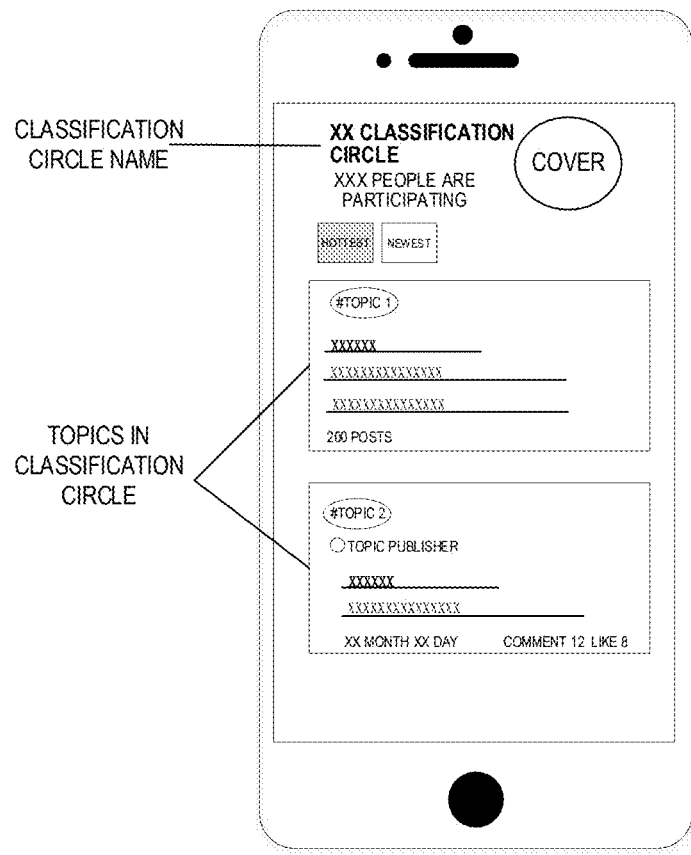
FIG. 3 shows a presentation effect diagram of a classification circle presentation page in the method of search result presentation according to an embodiment of the present disclosure.

A classification circle: a circle that is pre-created by a developer and where users can communicate around a certain classification. The classification circle includes a topic for discussion on books of the classification, and the topic may be created by the user. Books discussed in the topics may be different, but the book types are the same. For example, a presentation page corresponding to the classification circle may be as shown in FIG. 3.

A post: a content posted by a user in a certain topic.

It should be noted that similar reference numerals and letters represent similar items in the following drawings. Therefore, once an item is defined in one drawing, it is not required to be further defined and explained in subsequent drawings.

The term 'and/or' in the text merely describes an association relationship and indicates that there may be three relationships. For example, A and/or B may represent the following three cases: only A exists, both A and B exist, and only B exists. In addition, the term 'at least one' in the text means any of a plurality of types or any combination of at least two of the plurality of types. For example, at least one of A, B, and C may represent including any one or more elements selected from a set consisting of A, B, and C.

It may be understood that before the technical solutions disclosed in the embodiments of the present disclosure are used, the user should be informed of the type, scope of use, usage scenario, and the like of personal information involved in the present disclosure in an appropriate manner in accordance with relevant laws and regulations, and the authorization of the user should be obtained.

For example, when an active request of the user is received, prompt information is sent to the user to explicitly prompt the user that an operation requested by the user will need to acquire and use the personal information of the user. Therefore, the user can choose, based on the prompt information, whether to provide personal information to software or hardware such as an electronic device, an application, a server, or a storage medium that performs the operation of the technical solution of the present disclosure.

As an optional but non-limiting implementation, in response to receiving the active request of the user, the manner of sending the prompt information to the user may be, for example, a pop-up window, and the prompt information may be presented in the pop-up window in text. In addition, the pop-up window may further carry a selection control for the user to select 'Agree' or 'Disagree' to provide personal information to the electronic device.

It may be understood that the above notification and user authorization acquisition process is merely illustrative and does not limit the implementation of the present disclosure.

Other manners that comply with relevant laws and regulations may also be applied to the implementation of the present disclosure.

To facilitate the understanding of the present embodiment, a method of search result presentation disclosed in the embodiments of the present disclosure is first described in detail. An execution subject of the method of search result presentation provided in the embodiments of the present disclosure is generally a terminal device, and the terminal device may be a smart phone, a tablet computer, a personal computer, an in-vehicle device, a wearable device, or the like.

Figure 4:
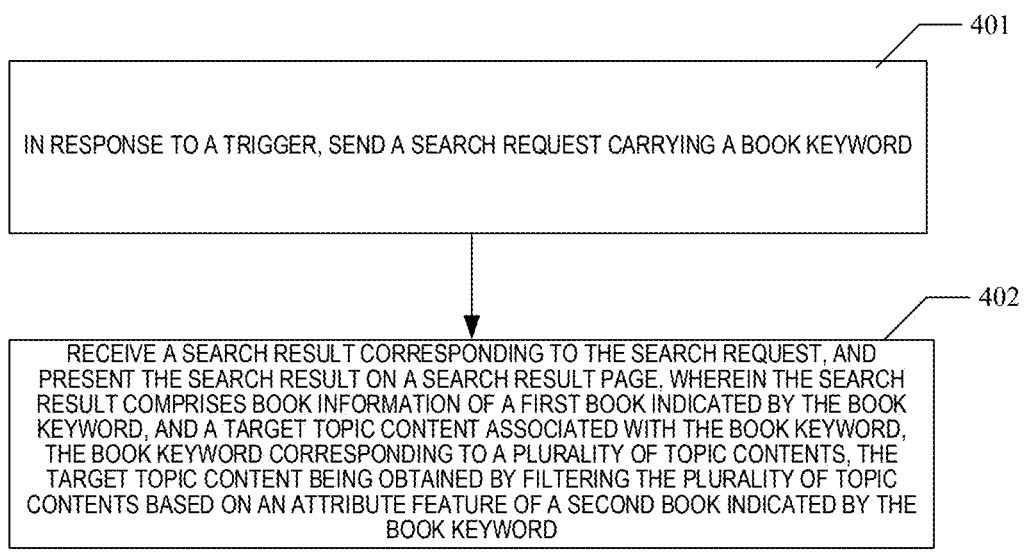
FIG. 4 shows a flowchart of a method of search result presentation according to an embodiment of the present disclosure.

Referring to FIG. 4, which is a flowchart of a method of search result presentation according to an embodiment of the present disclosure, the method includes steps 401 to 402, wherein:

At step 401, in response to a trigger, a search request carrying a book keyword is sent.

At step 402, a search result corresponding to the search request is received, and the search result is presented on a search result page, wherein the search result includes book information of a first book indicated by the book keyword, and a target topic content associated with the book keyword, the book keyword corresponding to a plurality of topic contents, the target topic content being obtained by filtering the plurality of topic contents based on an attribute feature of a second book indicated by the book keyword.

The following is a detailed description of the above steps.

For step 401, in response to a trigger may be generating, after detecting a trigger of a user on a corresponding button of a search interface, a search request carrying the book keyword based on the book keyword contained in a search box. In this specification, the trigger may be any one of a long press, a single click, a double click, a drag, and a slide.

The book keyword may refer to a keyword for characterizing book information. For example, the book keyword may include but is not limited to a book name, a book type, an author name, and the like.

For example, after the user enters 'AABB' in the search box and clicks a confirmation button, the search request may be a search request carrying 'AABB'.

For step 402, wherein the first book and the second book indicated by the book keyword may be books that are not completely the same or may be completely the same books. The first book and the second book may be books found based on the book keyword and different book search rules. For example, the first book indicated by the book keyword may refer to a book with a highest association with the book keyword, and the second book indicated by the book keyword may refer to a book with a highest hotness in a plurality of books associated with the book keyword.

In a possible implementation, when the book keyword includes or is a book name, a specific book (referring to a book with the same search results for a plurality of times) may be found based on the book name. Therefore, content presented on a search result page may be all content related to the book. In this case, the first book and the second book indicated by the book keyword are the same.

For example, when the book keyword is 'Journey to the West', a specific book Journey to the West may be found through the book keyword 'Journey to the West'. Therefore, topic content presented on the search result page may be related to the book Journey to the West. In this case, both the first book and the second book indicated by the book keyword are Journey to the West.

In this specification, when it is determined whether the book keyword includes a book name, the book keyword may be matched with a book name in a book name library. When the book keyword is completely consistent with a content of any book name in the book name library, it is determined that the book keyword includes a book name; or otherwise, it is determined that the book keyword does not include a book name.

Since the search request is a book search request, after it is determined that the searched book keyword includes a book name, it is further determined whether a book database includes a target book corresponding to the book name. When the book database does not include the target book, the search result may include only the target topic content associated with the book keyword (i.e., the book name), and does not include the book information.

In a possible implementation, when the book keyword is an author name, the first book indicated by the book keyword may be a book written by the author, and the first book and the second book indicated by the book keyword are the same.

In a further possible implementation, when the book keyword includes a book type, a specific book (referring to a book with different search results for a plurality of times, for example, the search result may be affected by an update status, hotness, and the like of the book) cannot be found based on the book keyword. Therefore, in addition to the book information of the first book indicated by the book keyword, the content presented on the search result page also needs to present topic content about further books as much as possible to assist the user in selecting a book.

Therefore, in this case, the first book indicated by the book keyword is a book that meets a first filtering condition in the book type, and the second book indicated by the book keyword is a book that meets a second filtering condition in the book type, the second book being at least partially different from the first book.

For example, the first filtering condition may be that a number of readers is ranked in the top N, and the second filtering condition may be that a number of times of collection is ranked in the top M, where both M and N are positive integers, and M and N may be equal or unequal.

The book information of the first book may refer to preview information of the first book. For example, the book information may include a book cover, a book name, an author name, an update status, a book introduction, and the like. In a possible scenario, the first book may include a book that has been read by the user. In this case, the book information of the first book may further include a book reading status (whether the book has been read), and when the book reading status of any book is 'read', the book information of the first book may further include preview information of an unread chapter.

The target topic content is topic content for assisting in selecting a book. When the user is selecting a book, the user may consider a plurality of conditions such as an update status and hotness information of the book. Therefore, to improve the assistance of the target topic content in selecting a book, attribute information of the second book may be combined when the target topic content is determined.

In this specification, the attribute information of the second book may include at least one of the following: an update status, hotness information, book quality information, or whether there is an associated book.

In this specification, the book quality information may refer to a quality score obtained by combining a user evaluation and features (such as a number of words, an update frequency, and the like) of the book, and the associated book may refer to a series of books, for example, a first part and a second part.

The plurality of topic contents corresponding to the book keyword may refer to topic content having an association relationship with the book keyword. For example, if the book keyword includes a book name, the plurality of topic contents corresponding to the book keyword may refer to a plurality of topic contents in a book circle of the book corresponding to the book name (for example, the plurality of topic contents may be topic content ranked in the top predetermined places in hotness in the book circle); or when the book keyword includes a book type, the plurality of topic contents corresponding to the book keyword may refer to a plurality of topic contents in a classification circle corresponding to the book type (for example, the plurality of topic contents may be topic content ranked in the top predetermined places in hotness in the classification circle); or when the book keyword includes neither a book name nor a book type, the plurality of topic contents corresponding to the book keyword may refer to topic content with an association between a topic title and the book keyword exceeding a predetermined value.

In practical applications, different topic contents may have different topic subjects. The topic subjects may include, for example, plot discussion, character discussion, content secondary creation, discussion on a series of books, and the like. In a possible implementation, when the target topic content is obtained, after the attribute feature of the second book indicated by the book keyword is determined, by filtering the plurality of topic contents based on a target topic subject matching the attribute feature of the second book indicated by the book keyword, and topic subjects of the plurality of topic contents corresponding to the book keyword Specifically, when the topic subject of each piece of topic content is determined, semantic analysis (for example, semantic analysis may be performed through a pre-trained semantic analysis network) may be performed on a title of the topic content to determine the topic subject of the topic content; or the topic subject of each piece of topic content may be determined through manual labeling.

When the target topic subject matching the attribute feature of the second book is determined, the target topic subject matching the attribute feature of the second book may be determined through a predetermined correspondence between an attribute feature and a topic subject, for example.

For example, when an update status of the second book is updating (i.e., the attribute feature is updating), and the target topic subject matching the attribute feature of the second book is plot and character discussion, topic content with a topic subject of plot discussion or character discussion may be selected from the plurality of topic contents corresponding to the book keyword as the target topic content.

In practical applications, there may be a plurality of second books, and attribute features of different second books may be different. When the target topic subject is determined, for any of the second books, filtered topic content corresponding to the second book may be filtered from the plurality of topic contents based on a target topic subject matching an attribute feature of the second book and topic subjects of the plurality of topic contents corresponding to the book keyword, and the filtered topic content corresponding to each of the second books constitutes the content in the target topic.

The presentation position of the search result page is limited. When a number of filtered topic contents corresponding to the second book exceeds a predetermined number, a predetermined number of target topic contents may be filtered from the plurality of filtered topic contents based on heat information of each piece of filtered topic content.

In this specification, it should be noted that the above steps of determining the target topic content may all be completed on the server, and the user terminal only receives the filtered target topic content; or the server may send the plurality of topic contents to the user terminal after determining the plurality of topic contents corresponding to the book keyword, and the user terminal filters the target topic content.

The specific presentation manner of the search result page will be described below.

In a possible implementation, when presenting the search result on the search result page, the book information of the first book indicated by the book keyword may be presented in a first position area of the search result page, and an entry identification of the target topic content may be presented at a corresponding target position of the first position area, the entry identification of the target topic content being configured to present a corresponding target topic content after being triggered.

Herein, the target position may be, for example, at a bottom position of the first position area (i.e., below a presentation area corresponding to the book information of the first book) or may be below the first position area.

Figure 5:
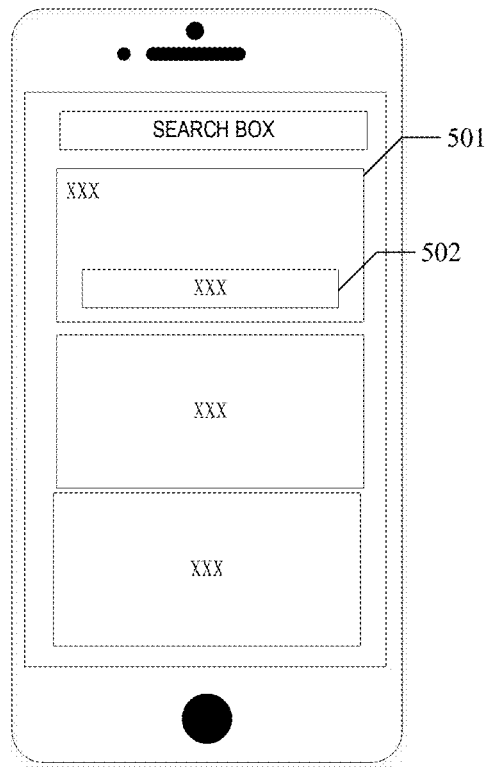
FIG. 5 shows a presentation effect diagram of a search result page in the method of search result presentation according to an embodiment of the present disclosure.

For example, the search result page may be shown in FIG. 5, wherein 501 is the first position area, and 502 is the target position.

In a possible implementation, the entry identification of the target topic content may be represented by title content of the target topic content.

Alternatively, in a further possible implementation, when the book keyword is a book name, the entry identification includes a book circle identification corresponding to the book name. Herein, the book circle is a topic set of target topic content determined based on the foregoing method. After the book circle identification is triggered, preview information of the plurality of target topic contents may be presented (for example, a page may be directly jumped to for presentation, or a floating layer may be added for presentation).

In a possible implementation, when the book keyword is a book type, the entry identification includes a classification circle identification corresponding to the book type. Herein, the classification circle is a topic set of target topic content determined based on the foregoing method. After the classification circle identification is triggered, preview information of the plurality of target topic contents may be presented.

For example, when the book keyword is 'metaphysics', the entry identification may be a metaphysical classification circle with a corresponding tag being 'metaphysics'.

In a further possible implementation, when the book keyword is an author name, a book work set of the author may be first determined, and the entry identification may be a book circle identification of each book in the book work set; or, a book type of each book in the book work set may be determined, and the entry identification may be a classification circle identification of the book type of each book.

Alternatively, in a further possible implementation, when the book keyword is an author name, an author circle corresponding to the author name may be determined. The author circle may be understood as a set of book circles of book works of the author.

In a further possible implementation, when the book keyword is neither a book type nor a book name, the search result may include only the book information of the first book indicated by the book keyword and does not include the target topic content. In this specification, the book information of the first book indicated by the book keyword may refer to book information of a book determined based on a fuzzy search performed using the book keyword.

The presentation effect of the presentation result page for the different entry identifications will be described in detail below:

1. The Entry Identification of the Target Topic Content is Characterized by a Title of the Topic Content In a possible implementation, when an entry identification of the target topic content is presented at a corresponding target position of the first position area, in accordance with a determination that the entry identification of the target topic content comprises a plurality, the entry identifications of a plurality of the target topic contents may be presented at the corresponding target position of the first position area in a scrolling manner.

Figure 6:
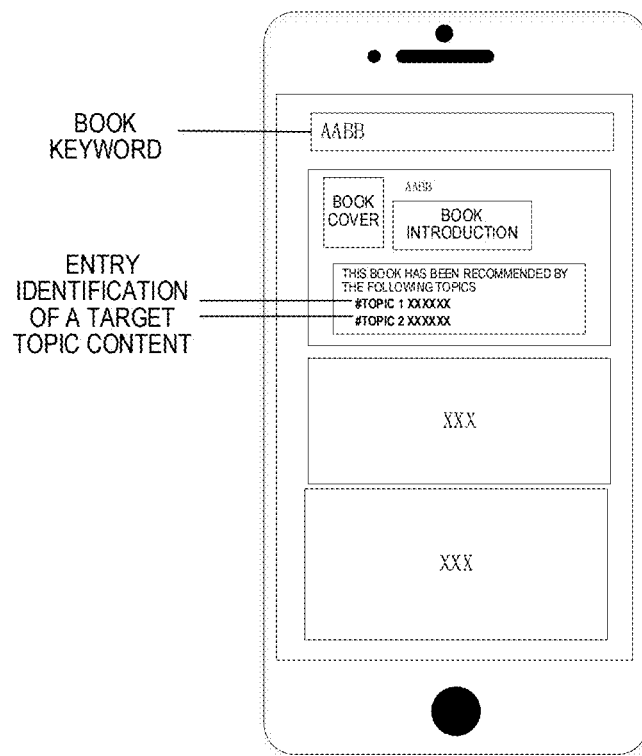
FIG. 6 shows a presentation effect diagram of an entry identification of target topic content in the method of search result presentation according to an embodiment of the present disclosure.

For example, the presentation effect of the entry identification of the target topic content on the search result page may be as shown in FIG. 6. The book keyword is 'AABB', and the entry identification of the corresponding target topic content is 'Topic 1 XXXXXX' and 'Topic 2 XXXXXX'.

2. A Book Circle Identification

In a possible implementation, when the book circle identification is presented at the corresponding target position of the first position area, the book circle identification, as well as topic identifications of a plurality of target topic contents contained in the book circle may be presented, at a corresponding target location of the first location area, in a scrolling manner.

Figure 7:
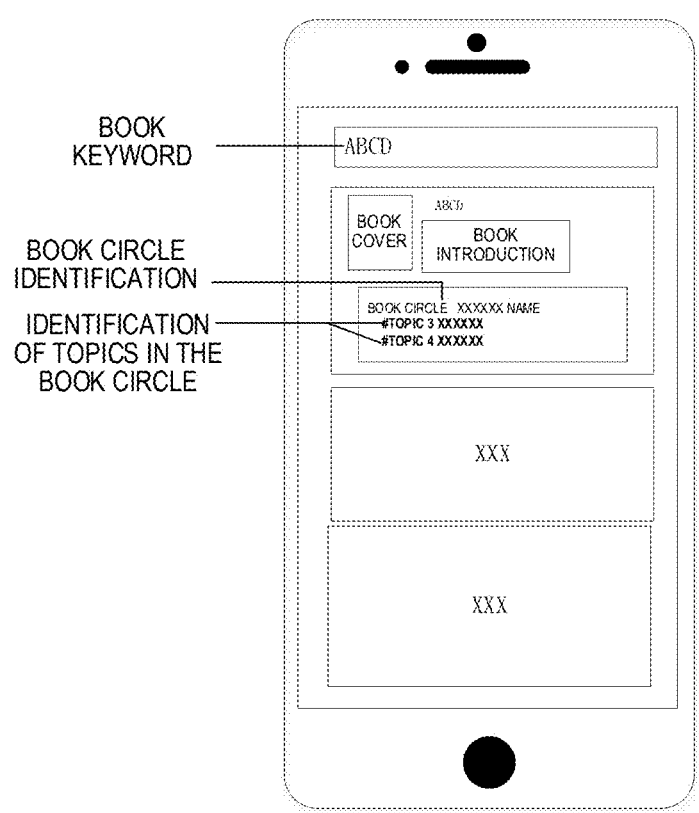
FIG. 7 shows a presentation effect diagram of an entry identification of a book circle in the method of search result presentation according to an embodiment of the present disclosure.

For example, the presentation effect of the book circle identification on the search result page may be as shown in FIG. 7. The book keyword is 'ABCD', the corresponding book circle identification is 'XXXXXX name', and the topic identifications presented in a scrolling manner are 'Topic 3 XXXXXX' and 'Topic 4 XXXXXX'.

3. A Classification Circle Identification

In a possible implementation, when the classification circle identification is presented at the corresponding target position of the first position area, the classification circle identification and a number of people for discussion corresponding to the classification circle may be presented at the corresponding target position of the first position area.

Figure 8A:
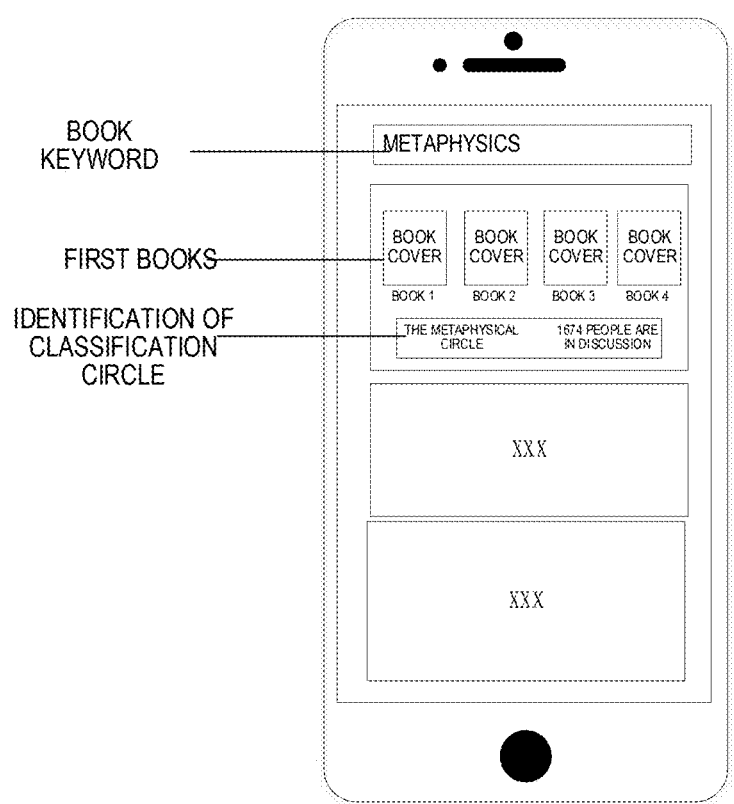
FIG. 8a shows a presentation effect diagram of an entry identification of a classification circle in the method of search result presentation according to an embodiment of the present disclosure.

Specifically, the presentation effect of the book circle identification on the search result page may be as shown in FIG. 8*a*. Herein, the book keyword is 'metaphysics', the book information of the first book indicated by the book keyword is horizontally presented in the first position area, 'metaphysical classification circle' and the number of discussants being presented at the target position.

Figure 8B:
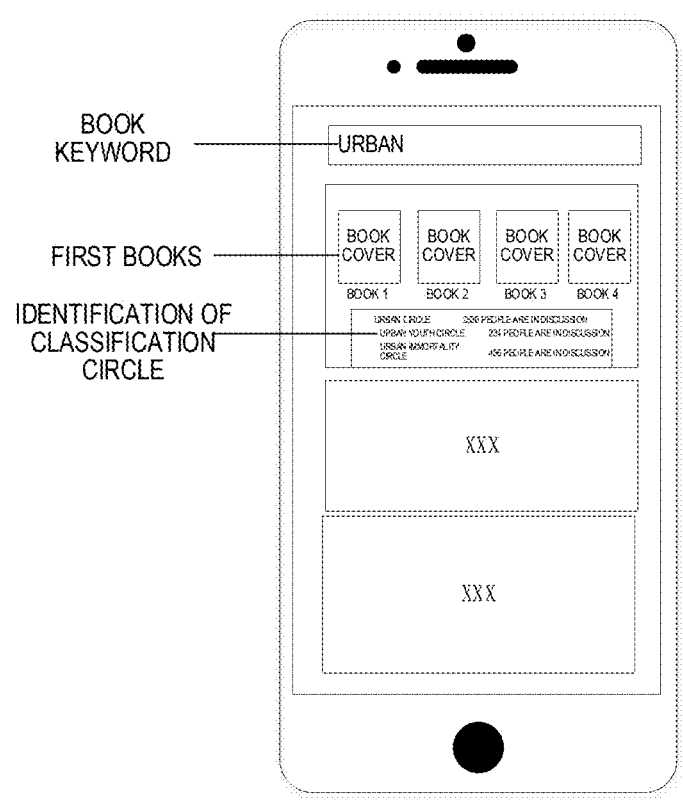
FIG. 8b shows a presentation effect diagram of a further entry identification of a classification circle in the method of search result presentation according to an embodiment of the present disclosure.

Further, each major classification may further include at least one vertical classification. For example, a major classification 'urban' may further include more refined vertical classifications such as 'urban youth', 'urban immortality', and 'urban daily'. Therefore, when the classification circle identification is presented, a vertical classification circle identification corresponding to the classification circle may also be presented below the area where the classification circle identification is presented. For example, the presentation effect of the vertical classification circle identification may be as shown in FIG. 8*b*. The classification circle identification is 'urban circle', and the vertical classification circle identification is 'urban youth' and 'urban immortality'.

In a possible implementation, in response to a trigger on the entry identification, the search result page may be jumped to an interactive content presentation page, and the target topic content may be presented on the interactive content presentation page; or, in response to a trigger on the entry identification, a floating layer may be overlaid on the search result page, an interactive content presentation page may be presented on the floating layer, and the target topic content may be presented on the interactive content presentation page.

Different interactive content entry identifications may be triggered to present different interactive content presentation pages. Specifically, the content presentation page corresponding to any target topic may be as shown in FIG. 1, wherein 'AABB' is a target topic name, and various post information is also presented on this page.

In a further possible implementation, when the entry identification is a book circle identification, a book circle content presentation page corresponding to the book circle identification is presented in response to a trigger on the book circle identification, and the book circle content presentation page presents a plurality of topic identifications associated with the book name. For example, the presentation effect of the book circle content presentation page may be as shown in FIG. 2. 'ABCD' is a book circle name, and 'Topic 1' and 'Topic 2' are topics created by the user.

Further, when the user further intends to view specific discussion content of any topic contained in the book circle, in response to a trigger on any topic identification, a content presentation page corresponding to the triggered topic identification is presented. For a specific presentation effect, refer to FIG. 1.

In a further possible implementation, when the interactive content entry identification is a classification circle identification, in response to a trigger on the classification circle identification, a classification circle content presentation page corresponding to the classification circle identification is presented, and the classification circle content presentation page presents a plurality of topic identifications associated with the book type. For the classification circle content presentation page, for example, may refer to FIG. 3. 'XX classification circle' is a corresponding classification circle title, and 'Topic 1' and 'Topic 2' are topics created by the user.

When the user continues to perform a trigger on any topic identification in the classification circle, in response to a trigger on any topic identification, a content presentation page corresponding to the triggered topic identification is presented. For a specific presentation effect, refer to FIG. 1.

In a further implementation, the target topic content may also be presented on the search result page in the form of an information card.

Specifically, in accordance with a determination that there is a plurality of target topic contents associated with the book keyword, presenting the search result on the search result page, a presentation order of the target topic contents may be determined based on associations with respect to the book keyword and/or hotness information; and preview information cards corresponding to the target topic contents are presented, on the search result page, in the presentation order.

In this specification, the preview information card corresponding to the target topic content may include but is not limited to at least one of a title of the target topic content, a number of posts of the target topic content, and preview information of a hot post of the target topic content.

In addition, to allow the user to more intuitively view the search result presented on the search result page, some contents on the search result page may also be presented with emphasis.

In a possible implementation, after presenting the search result on the search result page, key information associated with the book keyword in the book information corresponding to the search request may be determined, and the key information in the presented book information is labeled.

In a possible implementation, when determining the key information, text content in the book information may be compared with text content in the book keyword, and information that is completely consistent with the content in the two is determined as the key information.

For example, the book keyword is 'ABCD', and the book information is ABCD (book name), EF (author name), and ABXXXXXXX (book introduction). In this case, the key information is 'ABCD'.

Specifically, when the key information in the presented book information is labeled, the key information may be presented in highlight.

Figure 9:
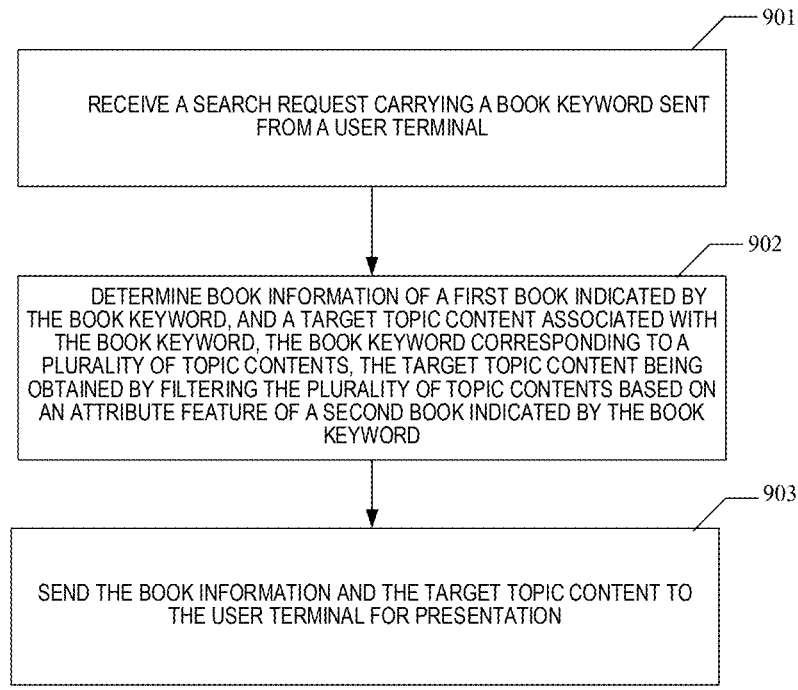
FIG. 9 shows a flowchart of a method of processing a search request according to an embodiment of the present disclosure.

An embodiment of the present disclosure further provides a method of processing a search request. Referring to FIG. 9, the embodiment of the present disclosure provides a method of processing a search request. The method is applied to a server and includes steps 901 to 903.

At step 901, a search request carrying a book keyword sent from a user terminal is received.

At step 902, book information of a first book indicated by the book keyword, and a target topic content associated with the book keyword are determined, the book keyword corresponding to a plurality of topic contents, the target topic content being obtained by filtering the plurality of topic contents based on an attribute feature of a second book indicated by the book keyword.

At step 903, the book information and the target topic content are sent to the user terminal for presentation.

For details, refer to the foregoing embodiments, and details are not described herein again.

A person skilled in the art may understand that in the foregoing method of the specific implementations, an order of writing the steps does not mean a strict order of execution and does not constitute any limitation on the implementation process. The specific execution order of the steps should be determined based on functions and a possible internal logic thereof.

Based on the same inventive concept, an embodiment of the present disclosure further provides an apparatus for search result presentation corresponding to the method of search result presentation. Since a principle of the apparatus in the embodiment of the present disclosure for solving a problem is similar to that of the method of search result presentation in the foregoing embodiment of the present disclosure, implementation of the apparatus may refer to implementation of the method, and details that are the same will not be repeated.

Figure 10:
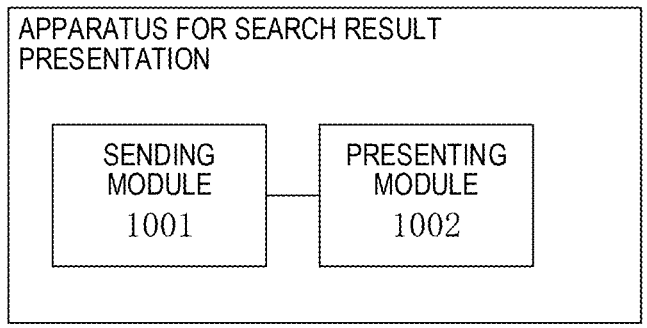
FIG. 10 shows a schematic diagram of an apparatus for search result presentation according to an embodiment of the present disclosure.

Referring to FIG. 10, which is a schematic diagram of a structure of an apparatus for search result presentation according to an embodiment of the present disclosure, the apparatus includes: a sending module 1001 and a presenting module 1002, wherein: the sending module 1001 is configured to, in response to a trigger, send a search request carrying a book keyword; and the presenting module 1002 is configured to receive a search result corresponding to the search request, and present the search result on a search result page, wherein the search result comprises book information of a first book indicated by the book keyword, and a target topic content associated with the book keyword, the book keyword corresponding to a plurality of topic contents, the target topic content being obtained by filtering the plurality of topic contents based on an attribute feature of a second book indicated by the book keyword.

In a possible implementation, in accordance with a determination that the book keyword comprises a book name, the first book and the second book indicated by the book keyword are the same; in accordance with a determination that the book keyword comprises a book type, the first book indicated by the book keyword is a book that meets a first filtering condition in the book type, and the second book indicated by the book keyword is a book that meets a second filtering condition in the book type, the second book being at least partially different from the first book.

In a possible implementation, the attribute feature comprises at least one of: an update status, hotness information, book quality information, or whether there is an associated book.

In a possible implementation, the target topic content is obtained, after the attribute feature of the second book indicated by the book keyword is determined, by filtering the plurality of topic contents based on a target topic subject matching the attribute feature of the second book indicated by the book keyword, and topic subjects of the plurality of topic contents corresponding to the book keyword.

In a possible implementation, when presenting the search result on the search result page, the presenting module 1002 is configured to: present, in a first position area of the search result page, the book information of the first book indicated by the book keyword; and present, at a corresponding target position of the first position area, an entry identification of the target topic content, the entry identification of the target topic content being configured to present a corresponding target topic content after being triggered.

In a possible implementation, when presenting, at the corresponding target position of the first position area, the entry identification of the target topic content, the presenting module 1002 is configured to: in accordance with a determination that the entry identification of the target topic content comprises a plurality, present, at a corresponding target position of the first position area, the entry identifications of a plurality of the target topic contents in a scrolling manner;

The presenting module 1002 is further configured to: in response to a trigger on the entry identification of any of the target topic contents presented in a scrolling manner, present a content presentation page of the triggered target topic content.

In a possible implementation, when t in accordance with a determination that there is a plurality of target topic contents associated with the book keyword, presenting the search result on the search result page, the presenting module 1002 is configured to: determine a presentation order of the target topic contents based on associations with respect to the book keyword and/or hotness information; and present, on the search result page, preview information cards corresponding to the target topic contents in the presentation order.

In a possible implementation, after presenting the search result on the search result page, the presenting module 1002 is further configured to: determine key information associated with the book keyword in the book information corresponding to the search request; and label the key information in the presented book information.

Figure 11:
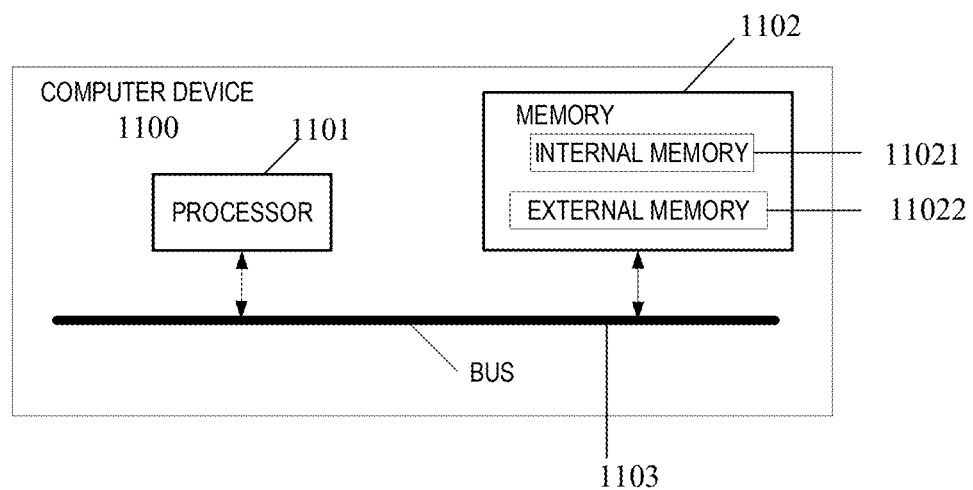
FIG. 11 shows a schematic structural diagram of a computer device 1100 according to an embodiment of the present disclosure.

An embodiment of the present disclosure further provides a computer device. Referring to FIG. 11, which is a schematic diagram of a structure of a computer device 1100 according to an embodiment of the present disclosure, the computer device includes a processor 1101, a memory 1102, and a bus 1103. Herein, the memory 1102 is configured to store execution instructions and includes a memory 11021 and an external memory 11022. The memory 11021 herein is also called an internal memory and is configured to temporarily store operation data in the processor 1101 and data exchanged with an external memory 11022 such as a hard disk. The processor 1101 exchanges data with the external memory 11022 through the internal memory 11021. When the computer device 1100 runs, the processor 1101 communicates with the memory 1102 through the bus 1103, so that the processor 1101 executes the following instructions: in response to a trigger, sending a search request carrying a book keyword; and receiving a search result corresponding to the search request, and presenting the search result on a search result page, wherein the search result comprises book information of a first book indicated by the book keyword, and a target topic content associated with the book keyword, the book keyword corresponding to a plurality of topic contents, the target topic content being obtained by filtering the plurality of topic contents based on an attribute feature of a second book indicated by the book keyword.

In a possible implementation, in the instructions executed by the processor 1101, in accordance with a determination that the book keyword comprises a book name, the first book and the second book indicated by the book keyword are the same; in accordance with a determination that the book keyword comprises a book type, the first book indicated by the book keyword is a book that meets a first filtering condition in the book type, and the second book indicated by the book keyword is a book that meets a second filtering condition in the book type, the second book being at least partially different from the first book.

In a possible implementation, in the instructions executed by the processor 1101, the attribute feature comprises at least one of: an update status, hotness information, book quality information, or whether there is an associated book.

In a possible implementation, in the instructions executed by the processor 1101, the target topic content is obtained, after the attribute feature of the second book indicated by the book keyword is determined, by filtering the plurality of topic contents based on a target topic subject matching the attribute feature of the second book indicated by the book keyword, and topic subjects of the plurality of topic contents corresponding to the book keyword.

In a possible implementation, in the instructions executed by the processor 1101, presenting the search result on the search result page comprises: presenting, in a first position area of the search result page, the book information of the first book indicated by the book keyword; and presenting, at a corresponding target position of the first position area, an entry identification of the target topic content, the entry identification of the target topic content being configured to present a corresponding target topic content after being triggered.

In a possible implementation, in the instructions executed by the processor 1101, presenting, at the corresponding target position of the first position area, the entry identification of the target topic content comprises: in accordance with a determination that the entry identification of the target topic content comprises a plurality, presenting, at a corresponding target position of the first position area, the entry identifications of a plurality of the target topic contents in a scrolling manner; and the method further comprising: in response to a trigger on the entry identification of any of the target topic contents presented in a scrolling manner, presenting a content presentation page of the triggered target topic content.

In a possible implementation, in the instructions executed by the processor 1101, in accordance with a determination that there is a plurality of target topic contents associated with the book keyword, presenting the search result on the search result page comprises: determining a presentation order of the target topic contents based on associations with respect to the book keyword and/or hotness information; and presenting, on the search result page, preview information cards corresponding to the target topic contents in the presentation order.

In a possible implementation, in the instructions executed by the processor 1101, after presenting the search result on the search result page, the method further comprises: determining key information associated with the book keyword in the book information corresponding to the search request; and labeling the key information in the presented book information.

An embodiment of the present disclosure further provides a computer-readable storage medium storing a computer program thereon. The computer program, when run by a processor, executes the steps of the method of search result presentation in the foregoing method embodiments. Herein, the storage medium may be a volatile or non-volatile computer-readable storage medium.

An embodiment of the present disclosure further provides a computer program product carrying program code, and instructions included in the program code can be configured to perform the steps of the method of search result presentation in the foregoing method embodiments. For details, refer to the foregoing method embodiments, and details are not described herein again.

Herein, the computer program product may be specifically implemented in a manner of hardware, software, or a combination thereof. In an optional embodiment, the computer program product is specifically embodied as a computer storage medium. In a further optional embodiment, the computer program product is specifically embodied as a software product, such as a software development kit (SDK) and the like.

Persons skilled in the art may clearly understand that, for the convenience and brevity of description, a specific working process of the foregoing system and apparatus may refer to a corresponding process in the foregoing method embodiment, and details are not described herein again. In the several embodiments provided in the present disclosure, it should be understood that the disclosed system, apparatus, and method may be implemented in other manners. The apparatus embodiments described above are merely illustrative. For example, the division of the units is merely logical function division and may be other division in actual implementation. For example, a plurality of units or components may be combined or integrated into a further system, or some features may be ignored or not performed. In addition, the presented or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts presented as units may or may not be physical units, and may be located in one position, or may be distributed on a plurality of network units. Some or all of the units may be selected according to actual needs to achieve the objectives of the solutions of the embodiments.

In addition, all the functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a non-volatile computer-readable storage medium executable by a processor. Based on such an understanding, the technical solutions of the present disclosure are essentially, or the part contributing to the prior art, or a part of the technical solutions may be embodied in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely specific implementations of the present disclosure, which are used to illustrate the technical solutions of the present disclosure but are not intended to limit the present disclosure. The scope of protection of the present disclosure is not limited thereto. Although the present disclosure is described in detail with reference to the foregoing embodiments, persons of ordinary skill in the art should understand that: any person skilled in the art can still modify the technical solutions described in the foregoing embodiments or can easily think of changes to the technical solutions described in the foregoing embodiments, or make equivalent replacements to some technical features thereof within the scope disclosed in the present disclosure; however, these modifications, changes, or replacements do not cause the essence of the corresponding technical solutions to depart from the spirit and scope of the technical solutions of the embodiments of the present disclosure, and all should be covered within the scope of protection of the present disclosure. Therefore, the scope of protection of the present disclosure shall be subject to the scope of protection of the claims.

What is claimed is:

1. A method of search result presentation, comprising:
    in response to a trigger, sending a search request carrying a book keyword; and
    receiving a search result corresponding to the search request, and presenting the search result on a search result page, wherein the search result comprises book information of a first book indicated by the book keyword, and a target topic content associated with the book keyword, the book keyword corresponding to a plurality of topic contents, the target topic content being obtained by filtering the plurality of topic contents based on an attribute feature of a second book indicated by the book keyword.

2. The method of claim 1, wherein in accordance with a determination that the book keyword comprises a book name, the first book and the second book indicated by the book keyword are the same;
    in accordance with a determination that the book keyword comprises a book type, the first book indicated by the book keyword is a book that meets a first filtering condition in the book type, and the second book indicated by the book keyword is a book that meets a second filtering condition in the book type, the second book being at least partially different from the first book.

3. The method of claim 1, wherein the attribute feature comprises at least one of:
    an update status, hotness information, book quality information, or whether there is an associated book.

4. The method of claim 1, wherein the target topic content is obtained, after the attribute feature of the second book indicated by the book keyword is determined, by filtering the plurality of topic contents based on a target topic subject matching the attribute feature of the second book indicated by the book keyword, and topic subjects of the plurality of topic contents corresponding to the book keyword.

5. The method of claim 1, wherein presenting the search result on the search result page comprises:
    presenting, in a first position area of the search result page, the book information of the first book indicated by the book keyword; and
    presenting, at a corresponding target position of the first position area, an entry identification of the target topic content, the entry identification of the target topic content being configured to present a corresponding target topic content after being triggered.

6. The method of claim 5, wherein presenting, at the corresponding target position of the first position area, the entry identification of the target topic content comprises:
    in accordance with a determination that the entry identification of the target topic content comprises a plurality, presenting, at a corresponding target position of the first position area, the entry identifications of a plurality of the target topic contents in a scrolling manner; and
    the method further comprising:
    in response to a trigger on the entry identification of any of the target topic contents presented in a scrolling manner, presenting a content presentation page of the triggered target topic content.

7. The method of claim 1, wherein in accordance with a determination that there is a plurality of target topic contents associated with the book keyword, presenting the search result on the search result page comprises:
    determining a presentation order of the target topic contents based on associations with respect to the book keyword and/or hotness information; and
    presenting, on the search result page, preview information cards corresponding to the target topic contents in the presentation order.

8. The method of claim 1, wherein after presenting the search result on the search result page, the method further comprises:
    determining key information associated with the book keyword in the book information corresponding to the search request; and labeling the key information in the presented book information.

9. A computer device, comprising: a processor, a memory, and a bus, the memory storing machine-readable instructions executable by the processor, the processor, when the computer device runs, communicating between the processor and the memory through the bus, the machine-readable instructions, when executed by the processor, executing acts comprising:

in response to a trigger, sending a search request carrying a book keyword; and receiving a search result corresponding to the search request, and presenting the search result on a search result page, wherein the search result comprises book information of a first book indicated by the book keyword, and a target topic content associated with the book keyword, the book keyword corresponding to a plurality of topic contents, the target topic content being obtained by filtering the plurality of topic contents based on an attribute feature of a second book indicated by the book keyword.

10. The computer device of claim 9, wherein in accordance with a determination that the book keyword comprises a book name, the first book and the second book indicated by the book keyword are the same;

in accordance with a determination that the book keyword comprises a book type, the first book indicated by the book keyword is a book that meets a first filtering condition in the book type, and the second book indicated by the book keyword is a book that meets a second filtering condition in the book type, the second book being at least partially different from the first book.

11. The computer device of claim 9, wherein the attribute feature comprises at least one of:

an update status, hotness information, book quality information, or whether there is an associated book.

12. The computer device of claim 9, wherein the target topic content is obtained, after the attribute feature of the second book indicated by the book keyword is determined, by filtering the plurality of topic contents based on a target topic subject matching the attribute feature of the second book indicated by the book keyword, and topic subjects of the plurality of topic contents corresponding to the book keyword.

13. The computer device of claim 9, wherein presenting the search result on the search result page comprises:

presenting, in a first position area of the search result page, the book information of the first book indicated by the book keyword; and presenting, at a corresponding target position of the first position area, an entry identification of the target topic content, the entry identification of the target topic content being configured to present a corresponding target topic content after being triggered.

14. The computer device of claim 13, wherein presenting, at the corresponding target position of the first position area, the entry identification of the target topic content comprises:

in accordance with a determination that the entry identification of the target topic content comprises a plurality, presenting, at a corresponding target position of the first position area, the entry identifications of a plurality of the target topic contents in a scrolling manner; and the method further comprising:

in response to a trigger on the entry identification of any of the target topic contents presented in a scrolling manner, presenting a content presentation page of the triggered target topic content.

15. The computer device of claim 9, wherein in accordance with a determination that there is a plurality of target topic contents associated with the book keyword, presenting the search result on the search result page comprises:

determining a presentation order of the target topic contents based on associations with respect to the book keyword and/or hotness information; and presenting, on the search result page, preview information cards corresponding to the target topic contents in the presentation order.

16. The computer device of claim 9, wherein after presenting the search result on the search result page, the method further comprises:

determining key information associated with the book keyword in the book information corresponding to the search request; and labeling the key information in the presented book information.

17. A non-transitory computer-readable storage medium, wherein there is a computer program stored thereon, the computer program, when executed by the processor, executing acts comprising:

in response to a trigger, sending a search request carrying a book keyword; and receiving a search result corresponding to the search request, and presenting the search result on a search result page, wherein the search result comprises book information of a first book indicated by the book keyword, and a target topic content associated with the book keyword, the book keyword corresponding to a plurality of topic contents, the target topic content being obtained by filtering the plurality of topic contents based on an attribute feature of a second book indicated by the book keyword.

18. The non-transitory computer-readable storage medium of claim 17, wherein in accordance with a determination that the book keyword comprises a book name, the first book and the second book indicated by the book keyword are the same;

in accordance with a determination that the book keyword comprises a book type, the first book indicated by the book keyword is a book that meets a first filtering condition in the book type, and the second book indicated by the book keyword is a book that meets a second filtering condition in the book type, the second book being at least partially different from the first book.

19. The non-transitory computer-readable storage medium of claim 17, wherein the attribute feature comprises at least one of:

an update status, hotness information, book quality information, or whether there is an associated book.

20. The non-transitory computer-readable storage medium of claim 17, wherein the target topic content is obtained, after the attribute feature of the second book indicated by the book keyword is determined, by filtering the plurality of topic contents based on a target topic subject matching the attribute feature of the second book indicated by the book keyword, and topic subjects of the plurality of topic contents corresponding to the book keyword.

* * * * *